United States Patent
Moriyama et al.

(10) Patent No.: US 9,619,516 B2
(45) Date of Patent: Apr. 11, 2017

(54) COMPUTER-READABLE RECORDING MEDIUM, DATA EXTRACTION METHOD, AND DATA EXTRACTION DEVICE

(71) Applicant: FUJITSU LIMITED, Kawasaki-shi, Kanagawa (JP)

(72) Inventors: Yasunobu Moriyama, Mishima (JP); Masahiko Nagata, Kawasaki (JP); Mitsuhiro Kinomura, Fuji (JP); Yoshihiro Yasuoka, Fuji (JP); Kiichi Yamada, Numazu (JP); Wakana Yamada, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 260 days.

(21) Appl. No.: 14/262,197

(22) Filed: Apr. 25, 2014

(65) Prior Publication Data
US 2014/0344268 A1 Nov. 20, 2014

(30) Foreign Application Priority Data

May 17, 2013 (JP) .................................. 2013-105573

(51) Int. Cl.
G06F 17/30 (2006.01)
G06Q 10/06 (2012.01)
G06Q 30/00 (2012.01)

(52) U.S. Cl.
CPC .. *G06F 17/30457* (2013.01); *G06F 17/30516* (2013.01); *G06Q 10/06* (2013.01); *G06Q 30/00* (2013.01)

(58) Field of Classification Search
CPC ..................... G06F 17/30457; G06F 17/30516
See application file for complete search history.

(56) References Cited

U.S. PATENT DOCUMENTS

| | | | |
|---|---|---|---|
| 5,428,774 A | 6/1995 | Takahashi et al. | |
| 5,710,915 A | 1/1998 | McElhiney | |
| 5,918,225 A | 6/1999 | White et al. | |
| 6,453,321 B1* | 9/2002 | Hill | G06F 17/30457 |
| 8,250,325 B2* | 8/2012 | Holdman | G06F 17/30159 |
| | | | 711/162 |
| 2003/0078915 A1 | 4/2003 | Chaudhuri et al. | |
| 2006/0047696 A1* | 3/2006 | Larson | G06F 17/30457 |

(Continued)

FOREIGN PATENT DOCUMENTS

| | | |
|---|---|---|
| JP | 04-102172 | 4/1992 |
| JP | 06-187379 | 7/1994 |

(Continued)

OTHER PUBLICATIONS

Ostrovsky, Precomputed view: A cool and useful SQL pattern, Apr. 14, 2009, retrieved Mar. 29, 2016 at http://igoro.com/archive/precomputed-view-a-cool-and-useful-sql-pattern/.*

(Continued)

*Primary Examiner* — William Spieler
(74) *Attorney, Agent, or Firm* — Staas & Halsey LLP

(57) ABSTRACT

A data extraction device generates, based on master information and an extraction condition, a determination result indicating whether the master information is an extraction target. When stream data is received, the data extraction device determined, using the determination result, whether the master information that is specified based on the received stream data is to be extracted.

5 Claims, 13 Drawing Sheets

(56) References Cited

U.S. PATENT DOCUMENTS

| | | |
|---|---|---|
| 2006/0129515 A1 | 6/2006 | Nagata et al. |
| 2009/0012951 A1* | 1/2009 | Vella ................. G06F 17/30938 |
| 2012/0054173 A1* | 3/2012 | Andrade ........... G06F 17/30516 |
| | | 707/714 |
| 2012/0324453 A1* | 12/2012 | Chandramouli .. G06F 17/30516 |
| | | 718/100 |
| 2014/0012879 A1 | 1/2014 | Hamada et al. |

FOREIGN PATENT DOCUMENTS

| | | |
|---|---|---|
| JP | 2006-171800 | 6/2006 |
| WO | 2012/164738 A1 | 12/2012 |

OTHER PUBLICATIONS

Stack Overflow, Modify materialized view query, Jun. 27, 2013, retrieved Mar. 29, 2016 at http://stackoverflow.com/questions/4274681/modify-materialized-view-query.*
Extended European Search Report dated Jun. 10, 2014 in corresponding European Patent Application No. 14166166.0.
"SQL Server—Introduction to expressor 3.4 Lookup Tables", Dave, Journey to SQL Authority with Pinal Dave, Sep. 2011, pp. 1-3.
Office Action issued by the Japanese Patent Office on Feb. 7, 2017 in corresponding Japanese patent application No. 2013-105573.

* cited by examiner

FIG.3

| KEY | PRODUCT | STYLE | PRICE |
|---|---|---|---|
| 0001 | PC | DESKTOP | 60000 |
| 0002 | PC | DESKTOP | 100000 |
| 0003 | PC | NOTE | 150000 |
| 0004 | PC | TABLET | 1000 |
| 0005 | PC | TABLET | 100000 |
| ... | ... | ... | ... |

FIG.4

```
lookup("Master", Stream.$KEY == Master.$KEY, $PRODUCT) == "PC"
AND
lookup("Master", Stream.$KEY == Master.$KEY, $STYLE) == "Note"
OR
lookup("Master", Stream.$KEY == Master.$KEY, $PRICE) < 100000
```

| KEY | PRODUCT | STYLE | PRICE |
|---|---|---|---|
| 0001 | TRUE | FALSE | TRUE |
| 0002 | TRUE | FALSE | FALSE |
| 0003 | TRUE | TRUE | FALSE |
| 0004 | TRUE | FALSE | TRUE |
| 0005 | TRUE | FALSE | FALSE |
| ... | ... | ... | ... |

| TIME | KEY | NAME |
|---|---|---|
| 2012-08-07 10:30 | 0003 | TOKKYO |

COMPUTER-READABLE RECORDING MEDIUM, DATA EXTRACTION METHOD, AND DATA EXTRACTION DEVICE

CROSS-REFERENCE TO RELATED APPLICATION

This application is based upon and claims the benefit of priority of the prior Japanese Patent Application No. 2013-105573, filed on May 17, 2013, the entire contents of which are incorporated herein by reference.

FIELD

The embodiments discussed herein are related to a data extraction program, a data extraction method, and a data extraction device.

BACKGROUND

A conventionally-used technique extracts data by determining whether received data matches the extraction condition. For example, data including sensor data and point of sale system (POS) data is collected using stream data in which data is coded. Stream data includes coded data. Thus, the specific contents of the data are extracted by checking the stream data with master information.

For example, the master information includes a plurality of pieces of master data including a key and a plurality of columns. A method in which the extraction condition is determined after the master check or a method in which the master data is determined in advance and the determination result is checked with the stream data is known as the method in which the master data is extracted using the master information and the stream data.

For example, the method in which the extraction condition is determined after the master check specifies the appropriate master data from the master information using the code in the stream data as a key. Then, it is determined whether the data corresponding to each column in the specified master data satisfies the extraction condition. When the data satisfies the extraction condition, the master data is extracted.

The method in which determination process is performed in advance determines whether each column in the master information satisfies the extraction condition such that extraction information obtained by extracting the key of each column satisfying the condition is generated. Then, the extraction information of each column is referred to using the code in the stream data as a key. When the extraction information of each column includes the key, the master data is extracted.

PTL 1: Japanese Laid-open Patent Publication No. 04-102172
PTL 2: Japanese Laid-open Patent Publication No. 06-187379
PTL 3: Japanese Laid-open Patent Publication No. 2006-171800

The techniques, however, have a problem in that the process time to take to extract the data is increased as, for example, the number of columns, the number of records, or the reception frequency of stream data increases.

For example, when there are M pieces of master data in the method in which the extraction condition is determined after the master check, the determination process is performed M times per a piece of stream data. This elongates the process time. When there are N columns in the method in which determination is performed in advance, N pieces of extraction information are generated. Thus, the determination process is performed N times per a piece of stream data. This elongates the process time.

SUMMARY

According to an aspect of the embodiments, a non-transitory computer-readable recording medium stores therein a data extraction program causing a computer to execute a process. The process includes generating, based on master information and an extraction condition, a determination result indicating whether the master information is an extraction target; and when stream data is received, determining, using the determination result, whether the master information that is specified based on the received stream data is to be extracted.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram of exemplary information stored in a master information DB;

FIG. 4 is a diagram of exemplary information stored in an extraction condition expression DB;

DESCRIPTION OF EMBODIMENTS

Preferred embodiments will be explained with reference to accompanying drawings. Note that the present invention is not limited to the embodiments. Furthermore, the embodiments can be combined with each other without conflicting with each other.

[a] First Embodiment

Whole Configuration

Figure 1:
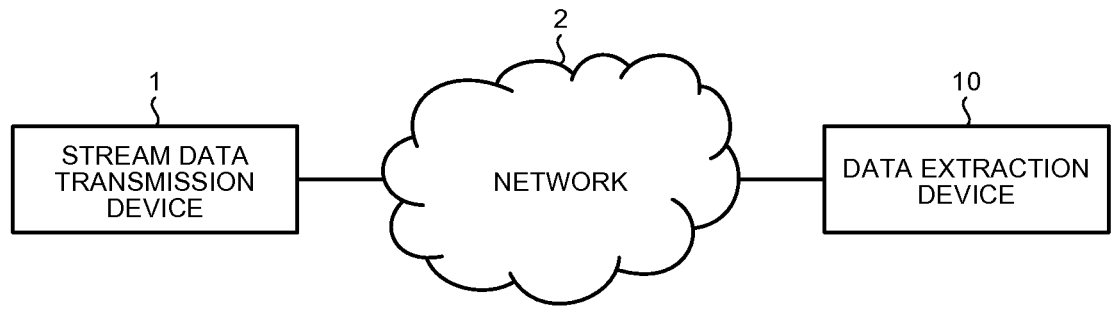
FIG. 1 is a diagram of an example of the whole configuration of a system according to a first embodiment.

FIG. 1 is a diagram of an example of the whole configuration of a system according to a first embodiment. As illustrated in FIG. 1, a stream data transmission device 1 and a data extraction device 10 are connected to each other through a network 2 such as the Internet in the system. Note that, although stream data is described as an example herein, the present invention is not limited to the example and can similarly process general data.

The stream data transmission device 1 is an exemplary device configured to transmit sensor data or POS data as stream data to the data extraction device 10. Note that, although FIG. 1 illustrates a stream data transmission device 1, the present invention is not limited to the number. The system can include a plurality of stream data transmission devices 1.

The data extraction device 10 is an exemplary server device configured to check the stream data with the master information in order to extract the specific contents in the data. The data extraction device 10 determines whether the data information in first data in which the key information is linked to the data information satisfies the extraction condition. Then, the data extraction device 10 generates second data in which the key information linked to the determined data information is linked to the determination result. Then, the data extraction device 10 specifies the determination result from each piece of the second data using the key information included in the received streaming data.

As described above, the data extraction device 10 performs a data extraction determination in the master information before receiving the stream data to generate the true-false determination result for each key in order to check the key in the data with the true-false determination result during the reception of the stream data. This speeds up the data extraction.

Configuration of Data Extraction Device

Figure 2:
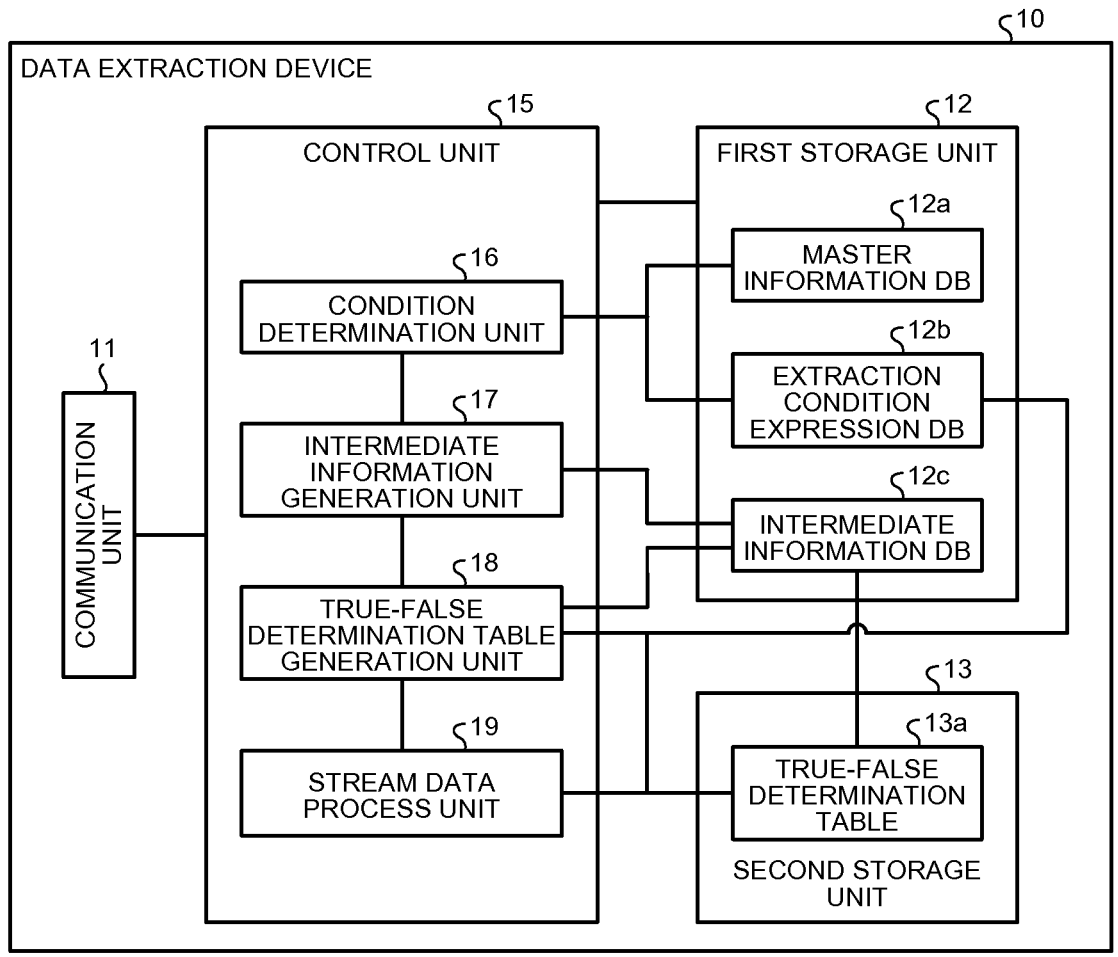
FIG. 2 is a functional block diagram of the functional configuration of a data extraction device according to the first embodiment.

FIG. 2 is a functional block diagram of the functional configuration of the data extraction device according to the first embodiment. As illustrated in FIG. 2, the data extraction device 10 includes a communication unit 11, a first storage unit 12, a second storage unit 13, and a control unit 15.

The communication unit 11 is a processing unit configured to establish the communication with another device and, for example, is a network interface card or a wireless interface. For example, the communication unit 11 receives the stream data transmitted from the stream data transmission device 1.

The first storage unit 12 is an exemplary storage device such as a hard disk that is relatively large in capacity and stores a master information DB 12a, an extraction condition expression DB 12b, and an intermediate information DB 12c. The first storage unit 12 further stores data and various programs to implement various functions of the data extraction device 10.

The master information DB 12a is a database storing master data indicating the specific contents specified in the stream data. FIG. 3 is a diagram of exemplary information stored in the master information DB. As illustrated in FIG. 3, the master information DB 12a stores the master data in which "a key, a product, a style, and a price" are linked to each other. Note that, although the product information on personal computers is described as an example herein, the contents of the master information are not limited to the example.

In that case, the stored "key" is the key information used for searching the master data. The "product" is the information indicating which the master data stores, a personal computer or another product. The "style" is the information indicating which personal computer is stored in the master data, a desktop computer, a tablet computer, or a node computer. The "price" is the information indicating the price of the product.

FIG. 3 illustrates that the top of the master data of which "key" is "0001" is a "PC" in the "desktop" type and the price is "60000 yen", and the third piece of the master data of which "key" is "0003" is a "PC" in the "note" type and the price is "150000 yen".

The extraction condition expression DB 12b is a database storing the condition expressions for extracting the master data from the stream data. In that case, the stored extraction conditions are set and stored, for example, by the administrator. FIG. 4 is a diagram of exemplary information stored in the extraction condition expression DB.

The extraction condition illustrated in FIG. 4 indicates that the master data in which the "product" is a "PC", and the "style" is a "note" or the "price" is "less than 100,000" is extracted from the master data matching the "key" in the stream data.

Figures 5, 6, 7:
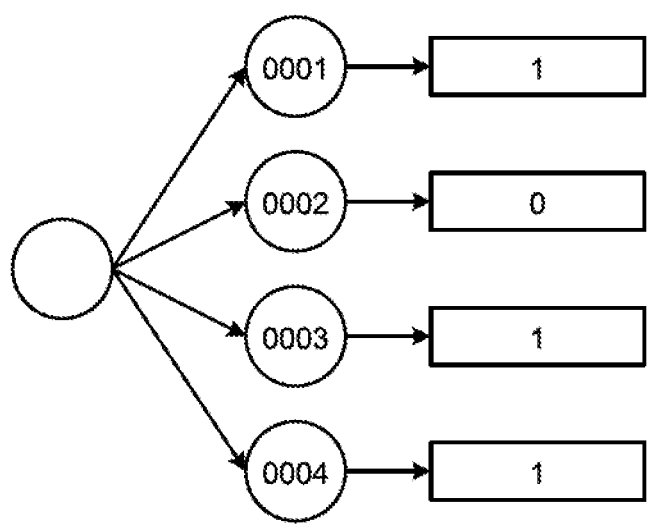
FIG. 5 is a diagram of exemplary information stored in an intermediate information DB.
FIG. 6 is a diagram of an exemplary true-false determination table.
FIG. 7 is a diagram of exemplary stream data.

The intermediate information DB 12c is a database storing the intermediate data generated when a true-false determination table is generated from the master data. FIG. 5 is a diagram of exemplary information stored in the intermediate information DB. As illustrated in FIG. 5, the intermediate information DB 12c stores the determination result of the extraction condition for each of "the key, the product, the style, and the price".

The information indicated by the stored "key, product, style, and price" is similar to the information in FIG. 3 and thus the description will be omitted. FIG. 5 illustrates that the "production" in the master data of which key is "0001" has been determined as "True", the "style" has been determined as "False", and the "price" has been determined as "True".

The second storage unit 13 is an exemplary storage unit such as a memory on which a processor directly reads and writes, and stores a true-false determination table 13a. The true-false determination table 13a is stored when the control unit 15 develops the master information DB 12a in the first storage unit 12 to the second storage unit 13.

FIG. 6 is a diagram of an exemplary true-false determination table. As illustrated in FIG. 6, the true-false determination table 13a stores the "key" and the "determination result" with linking them to each other. The "key" corresponds to the "key" in the master data in the master information DB 12a. When satisfying the extraction condition, the "determination result" stores "1". When not satisfying the extraction condition, the "determination result" stores "0". Note that, although FIG. 6 illustrates an exemplary true-false determination table generated in a form of FBT hydra, the present invention is not limited to the example. The true-false determination table can be stored in an arbitrary form.

The control unit 15 is a processing unit that controls the processes of whole of the data extraction device 10, and includes a condition determination unit 16, an intermediate information generation unit 17, a true-false determination table generation unit 18, and a stream data process unit 19. The control unit 15 is an exemplary electronic circuit in a processor. The condition determination unit 16, the intermediate information generation unit 17, the true-false determination table generation unit 18, or the stream data process unit 19 is an example of the process performed with the processor.

The condition determination unit 16 is a processing unit configured to determine whether each piece of configuration data included in the master data satisfies the extraction condition. Specifically, the condition determination unit 16 reads the master data from the master information DB 12a, and reads the extraction condition expression from the extraction condition expression DB 12b in order to determine whether each column that is an example of the configuration data included in each piece of the master data satisfies the condition. Then, the condition determination unit 16 outputs the determination result to the intermediate information generation unit 17.

For example, the condition determination unit 16 extracts the "key (0001), product (PC), style (Desktop), and price (60000)" as the master data from the master information DB 12a. The condition determination unit 16 reads the extraction condition expression illustrated in FIG. 4 "product=PC AND (style=note) or (price=less than 100000)" from the extraction condition expression DB 12b.

Then, the condition determination unit 16 determines that the column of the "product" satisfies the condition from the fact that the product is a "PC". The condition determination unit 16 determines that the column of the "style" does not satisfy the condition from the fact that the style is a "Desktop". The condition determination unit 16 further determines that the column of the "price" satisfies the condition from the fact that the price is "60000".

After that, the condition determination unit 16 outputs the fact that the master data of which "key" is "0001" is linked to the "product (True), style (False), and price (True)" to the intermediate information generation unit 17.

The intermediate information generation unit 17 is a processing unit configured to generate the intermediate information based on the determination result by the condition determination unit 16. Specifically, the intermediate information generation unit 17 combines the determination results by the condition determination unit 16 for each key to store them in the intermediate information DB 12c.

For example, the intermediate information generation unit 17 receives the fact that the master data of which "key" is "0001" is linked to the "product (True), style (False), and price (True)" from the condition determination unit 16. In that case, the intermediate information generation unit 17 generates "0001, True, False, and True" as the "key, product, style, and price" to store it in the intermediate information DB 12c.

The true-false determination table generation unit 18 is a processing unit configured to generate a true-false determination table from the intermediate information generated with the intermediate information generation unit 17. Specifically, the true-false determination table generation unit 18 reads the intermediate data from the intermediate information DB 12c and reads the extraction condition expression from the extraction condition expression DB 12b in order to determine whether the intermediate information satisfies the condition. Then, the true-false determination table generation unit 18 stores the result as the true-false determination table 13a in the second storage unit 13.

For example, the true-false determination table generation unit 18 reads the "key (0001), product (True), style (False), and price (True)" as the intermediate data from the intermediate information DB 12c. The true-false determination table generation unit 18 further reads the extraction condition expression illustrated in FIG. 4 "product=PC AND (style=note) or (price=less than 100000)" from the extraction condition expression DB 12b.

Then, the true-false determination table generation unit 18 determines whether the intermediate data of which key is "0001" satisfies the fact that "the product is True and (the style is Treu) or (the price is True)" specified based on the extraction condition. In that case, the true-false determination table generation unit 18 determines that the intermediate data satisfies the extraction condition because the product and price are True in the "key (0001), product (True), style (False), and price (True)". As a result, the true-false determination table generation unit 18 links "0001 and 1" to each other as the "key and determination result" to add them to the true-false determination table 13a.

Herein, an example in which the true-false determination table generation unit 18 generates the true-false determination table 13a is described. However, the present invention is not limited to the example. For example, the true-false determination table generation unit 18 can generate a database in a key value store (KVS) form in which the "key" and the "determination result" are linked to each other instead of the true-false determination table 13a.

The stream data process unit 19 is a processing unit configured to receive the stream data and extract data based on the true-false determination table 13a. Specifically, the stream data process unit 19 extracts a key from the received stream data. Then, the stream data process unit 19 searches the "determination result" linked to the extracted key from the true-false determination table 13a. After that, when the searched "determination result" is "1", the stream data process unit 19 specifies that the "determination result" is to be extracted. Then, the stream data process unit 19 extracts the master data linked to the key in the stream data from the master information DB 12a. On the other hand, when the searched "determination result" is "0", the stream data process unit 19 specifies that the "determination result" is not to be extracted and thus curbs the data extraction.

Hereinafter, a specific example will be described. FIG. 7 is a diagram of exemplary stream data. The stream data in FIG. 7 is POS data as an example. As illustrated in FIG. 7, the stream data that the stream data transmission device 1 transmits is coded data including "a time, a key, and a name". The "time" is the time when the stream data has been transmitted or the time when the stream data has been generated. The "key" is a code specifying specific data and is used for the search of the master data. The "name" indicates the user who has generated the stream data or, namely, the POS data. FIG. 7 illustrates the stream data which has been generated on "2012-08-07 10:30", of which "key" is "0003", and of which name is "TOKKYO".

For example, a specific example will be described using the stream data in FIG. 7 and the true-false determination table in FIG. 6. The stream data process unit 19 extracts the "0003" as the key from the received stream data "2012-08-07 10:30, 0003, and TOKKYO". Then, the stream data process unit 19 searches the true-false determination table in FIG. 6 using the extracted key "0003" as a search key in order to specify "1" as the determination result.

As a result, the stream data process unit 19 determines the stream data as the data to be extracted. Then, the stream data process unit 19 searches the master information DB 12*a* using the key "0003" in the stream data as a search key in order to extract the "key (0003), product (PC), style (Note), and price (60000)".

Exemplary Generation of True-False Determination Table

Figure 8:
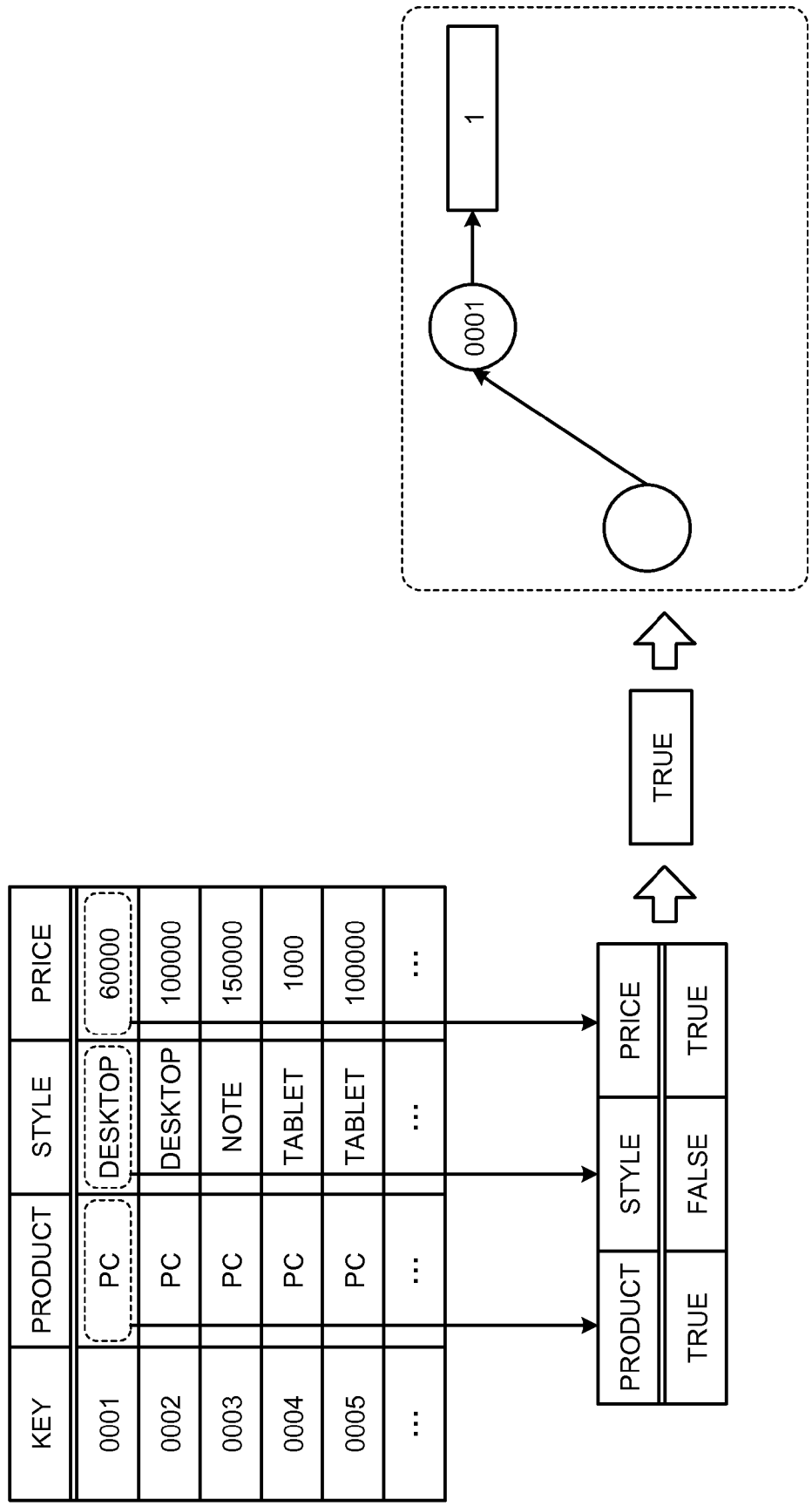
FIG. 8 is a diagram of an exemplary generation 1 of the true-false determination table.
Figure 9:
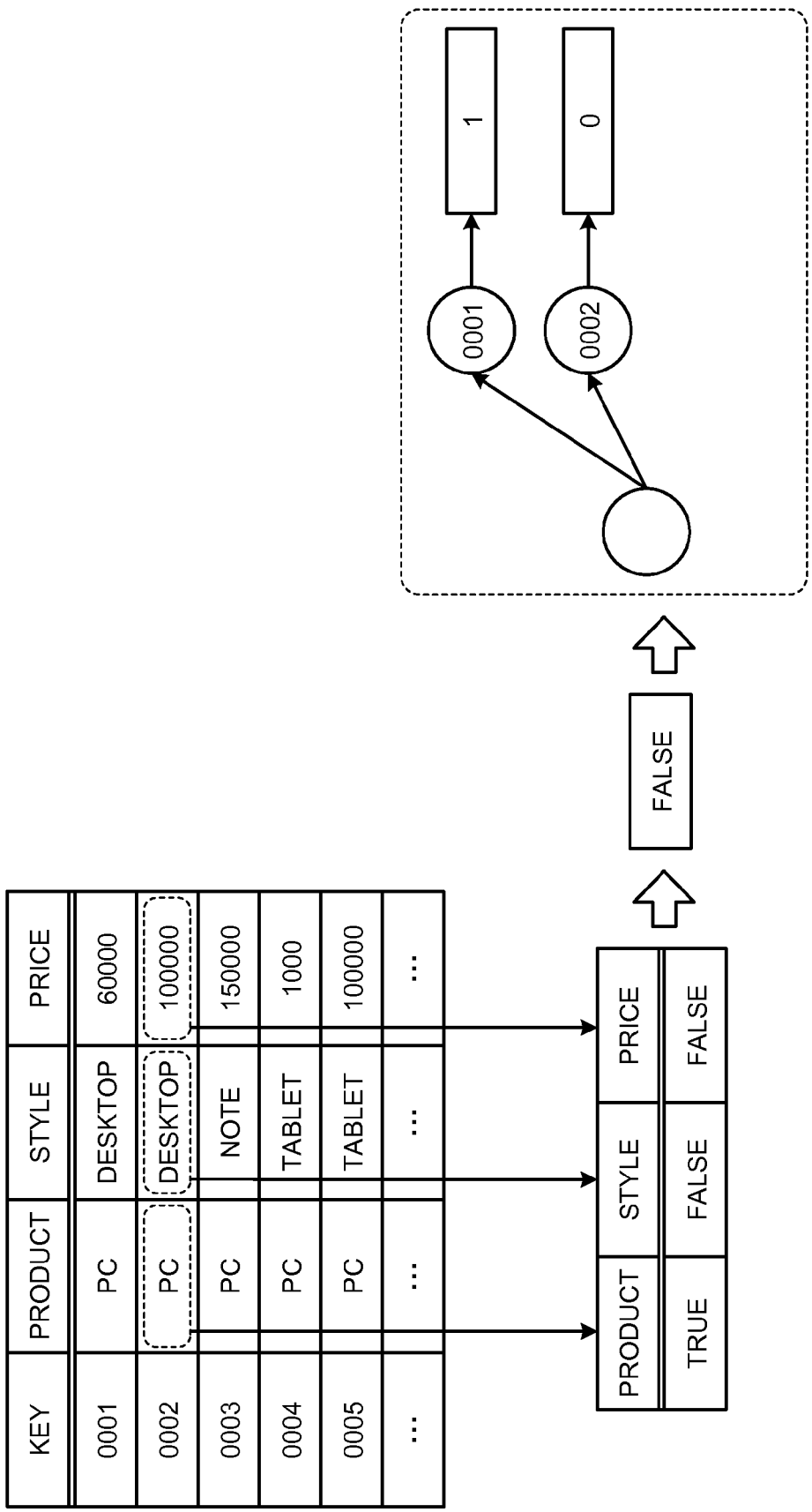
FIG. 9 is a diagram of an exemplary generation 2 of the true-false determination table.

FIG. 8 is a diagram of an exemplary generation 1 of a true-false determination table. FIG. 9 is a diagram of an exemplary generation 2 of a true-false determination table. As illustrated in FIG. 8, the condition determination unit 16 determines whether each of the product (PC), style (Desktop), and price (60000) in the master data of which key is "0001" in the master information DB 12*a* satisfies the extraction condition. Then, the condition determination unit 16 determines "True" or "False" indicating whether each satisfies the condition.

Subsequently, the intermediate information generation unit 17 generates the intermediate data linking the master data of which key is "0001" to the determination results "product (True), style (False), and price (True)" by the condition determination unit 16 in order to store the intermediate data in the intermediate information DB 12*c*.

After that, from the intermediate data "product (True), style (False), and price (True)" of the master data of which key is "0001" and the extraction condition, the true-false determination table generation unit 18 specifies that the master data is the data to be extracted. Then, the true-false determination table generation unit 18 generates the true-false determination table 13*a* linking the "key (0001)" to "True".

Subsequently, as illustrated in FIG. 9, the condition determination unit 16 determines whether each of the product (PC), style (Desktop), and price (100000) in the master data of which key is "0002" in the master information DB 12*a* satisfies the extraction condition. Then, the condition determination unit 16 determines "True" or "False" indicating whether each satisfies the condition.

Subsequently, the intermediate information generation unit 17 generates the intermediate data linking the master data of which key is "0002" to the determination results "product (True), style (False), and price (True)" by the condition determination unit 16 in order to store the intermediate data in the intermediate information DB 12*c*.

After that, from the intermediate data "product (True), style (False), and price (False)" of the master data of which key is "0002" and the extraction condition, the true-false determination table generation unit 18 specifies that the master data is the data not to be extracted. Then, the true-false determination table generation unit 18 generates the true-false determination table 13*a* linking the "key (0002)" to "False". As described above, the data extraction device 10 performs the data extraction determination of the master information before receiving the stream data in order to generate the true-false determination table 13*a* for each key.

Flow of Process

Figure 10:
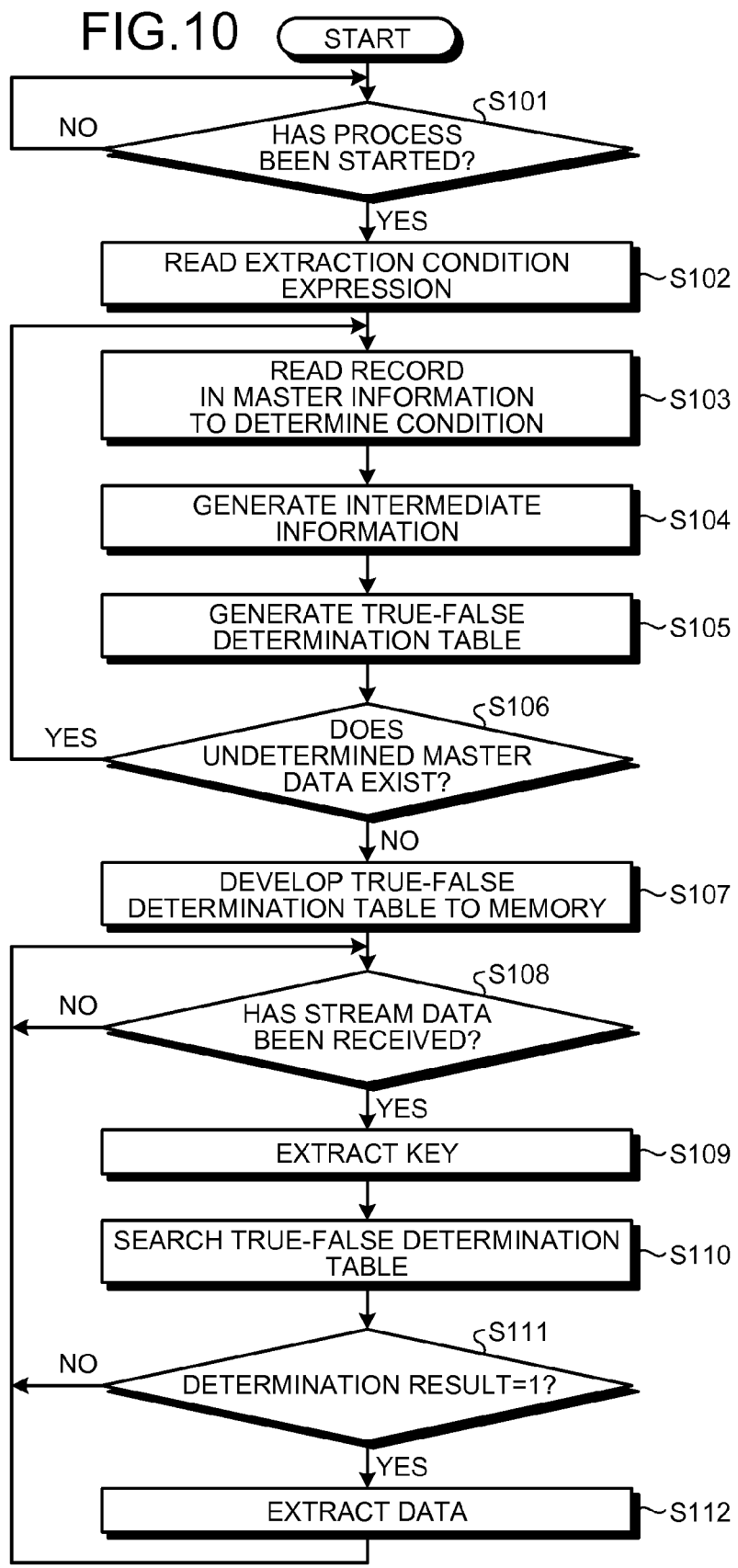
FIG. 10 is a flowchart describing the flow of a data extraction process according to the first embodiment.

FIG. 10 is a flowchart describing the flow of a data extraction process according to the first embodiment. As illustrated in FIG. 10, once the process has been started, in other words, once the development of the master information to a memory has been instructed (step S101: Yes), the condition determination unit 16 in the data extraction device 10 reads the extraction condition expression from the extraction condition expression DB 12*b* (step S102).

Subsequently, the condition determination unit 16 reads a record or, namely, a piece of master data from the master information DB 12*a* in order to determine whether the data of each column satisfies the extraction condition (step S103).

Then, the intermediate information generation unit 17 generates intermediate information based on the result from the condition determination unit 16 to store the intermediate information in the intermediate information DB 12*c* (step S104). Subsequently, the true-false determination table generation unit 18 generates the true-false determination table 13*a* from the intermediate data stored in the intermediate information DB 12*c* and the extraction condition expression stored in the extraction condition expression DB 12*b* (step S105).

After that, when undetermined master data exists in the master information DB 12*a* (step S106: Yes), the data extraction device 10 goes back to step S103 to repeat the procedures in and after step S103. On the other hand, when undetermined master data does not exist in the master information DB 12*a* (step S106: No), the true-false determination table generation unit 18 develops the true-false determination table 13*a* to the memory (step S107). For example, the true-false determination table generation unit 18 stores the generated true-false determination table 13*a* in the second storage unit 13.

After that, when receiving the stream data (step S108: Yes), the stream data process unit 19 extracts a key from the stream data (step S109). Subsequently, the stream data process unit 19 searches the true-false determination table 13*a* using the extracted key (step S110).

When the determination result stores "1" (step S111: Yes), the stream data process unit 19 extracts the master data corresponding to the key in the stream data from the master information DB 12*a* (step S112). In other words, the stream data process unit 19 extracts the master data when the searched true-false determination table 13*a* is "1".

After that, the stream data process unit 19 goes back to step S108 to repeat the procedures in and after step S108. When the determination result stores "0", in other words, when the searched true-false determination table 13*a* is "0" (step S111: No), the stream data process unit 19 goes back to step S108 to repeat the procedures in and after step S108 without extracting the master data.

As described above, the data extraction device 10 according to the first embodiment performs the data extraction determination of the master information before receiving the stream data in order to generate the true-false determination result for each key. Then, the data extraction device 10 checks the key in the data with the true-false determination result when receiving the stream data. Thus, the data extraction device 10 can specify whether the data is the data to be extracted by searching the true-false determination table 13*a* using the key in the received stream data. This can speed up the data extraction.

The data extraction device 10 can obtain the extraction process result by only a check of the key after the arrival of the stream data. This reduces the risk of the process delay in a stream data process in which immediacy is demanded.

The data extraction device 10 can obtain the extraction process result without depending on the complexity of the extraction condition on the master data. The data extraction device 10 can obtain the extraction process result without depending on the number of the extraction conditions on the master data. Even when there is a plurality of the extraction conditions on the master data, the data extraction device 10 maintains a determination table and thus can reduce the used amount of memory. The data extraction device 10 can curb the load of the processor because not performing a computation process after the arrival of the stream data.

[b] Second Embodiment

Next, an example in which the true-false determination table 13a is updated will be described. Hereinafter, an example in which the true-false determination table 13a is updated when the master data stored in the master information 12a has been updated and an example in which the true-false determination table 13a is updated when the extraction condition expression has been updated will be described.

Exemplary Update of Master Information

Figure 11:
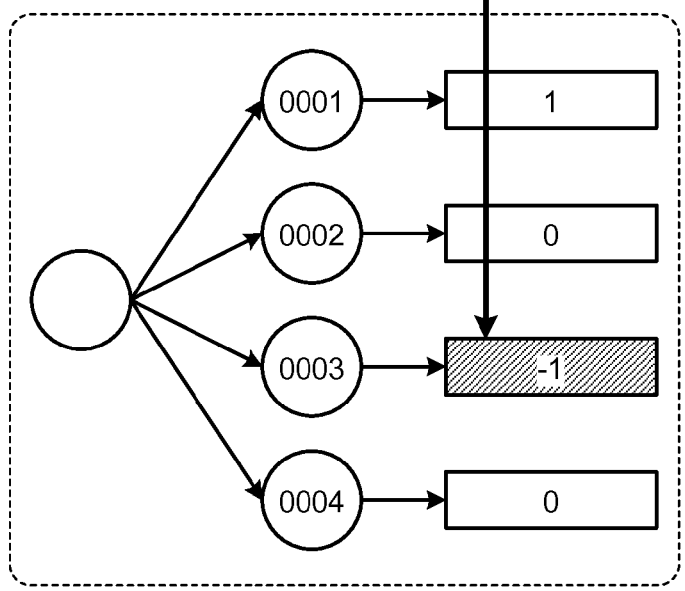
FIG. 11 is a diagram of an exemplary deletion of the master information according to a second embodiment.

FIG. 11 is a diagram of an exemplary deletion of the master information according to a second embodiment. With reference to FIG. 11, an example in which the update of the master data updates the determination result of the true-false determination table 13a will be described. Hereinafter, the deletion of the master data will be described as an example.

As illustrated in FIG. 11, the true-false determination table generation unit 18 in the data extraction device 10 detects that the master data of which key is "0003" has been deleted in the master data stored in the master information DB 12a. Then, the true-false determination table generation unit 18 stores "−1 (NULL)" in the determination result linked to the key "0003" in the true-false determination table 13a. The "−1" is exemplary information indicating that the master data does not exist.

In such a manner, the data extraction device 10 can perform a data extraction process without creating a true-false determination table 13a again even when the master data has been deleted. This can prevent, for example, the delay of the data process. Further, it is easy to recognize which piece of master data has been deleted. This can efficiently manage the data including the true-false determination table 13a and the master data.

Exemplary Update of Extraction Condition

Figure 12:
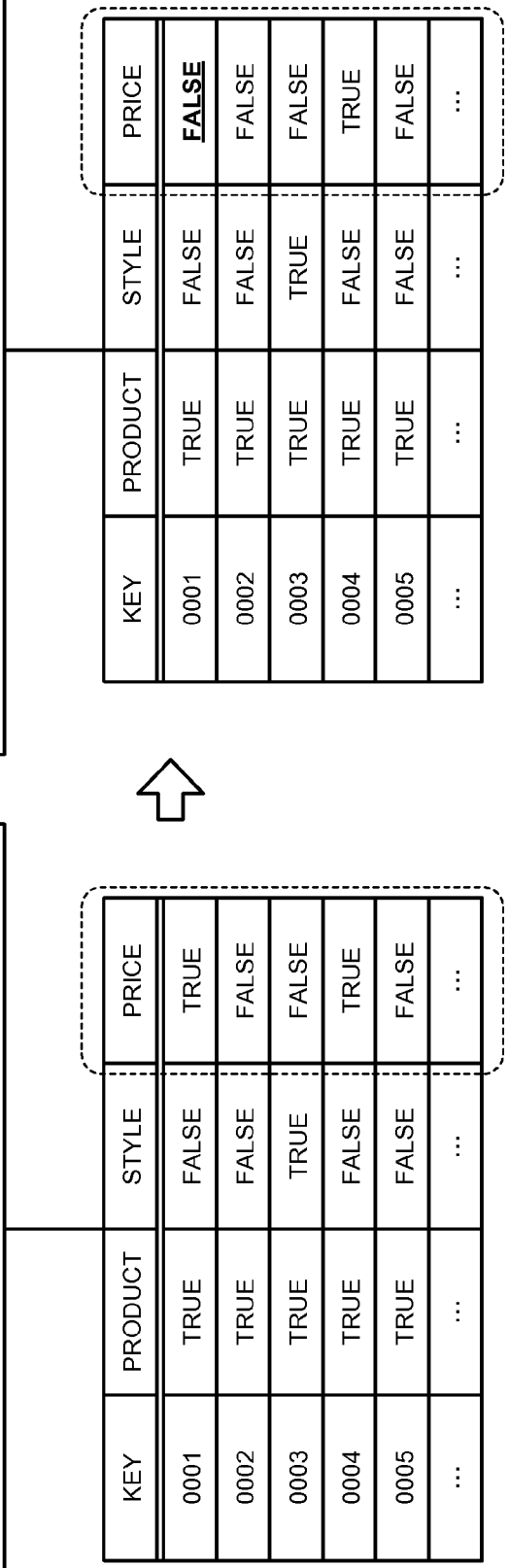
FIG. 12 is a diagram of an exemplary update of the extraction condition according to the second embodiment.

FIG. 12 is a diagram of an exemplary update of the extraction condition according to the second embodiment. As illustrated in FIG. 12, the data extraction device 10 stores the intermediate data illustrated in FIG. 5 as the progress in the data extraction determination based on the extraction condition expression "product=PC AND (style=note) or (price=less than 100000)".

It is assumed that the extraction condition expression "product=PC AND (style=note) or (price=less than 100000)" has been updated to the extraction condition expression "product=PC AND (style=note) or (price=less than 50000)" in such a state. In other words, it is assumed that the condition of the price is updated from the "price<100000" to the "price<50000".

On the assumption, the condition determination unit 16 determines again, in each master data stored in the master information DB 12a, only whether the updated "price" satisfies the extraction condition. The intermediate information generation unit 17 reflects only the determination result of the "price" determined by the condition determination unit 16 on the intermediate data in the intermediate information DB 12c. The price linked to the key "0001" is changed from "True" to "False" in FIG. 12.

After that, the true-false determination table generation unit 18 updates the true-false determination table 13a using the updated intermediate data and the updated extraction condition expression. As described above, the data extraction device 10 updates the intermediate data by performing an extraction determination of the updated part again even when the search condition expression has been updated. As a result, the data extraction device 10 can change the true-false determination table 13a at a high speed even when the search condition expression has been updated. This can prevent, for example, the delay of the data process.

[c] Third Embodiment

Next, a stream data process when the true-false determination table 13a is updated will be described using FIGS. 13 to 16.

Processing Method 1

Figure 13:
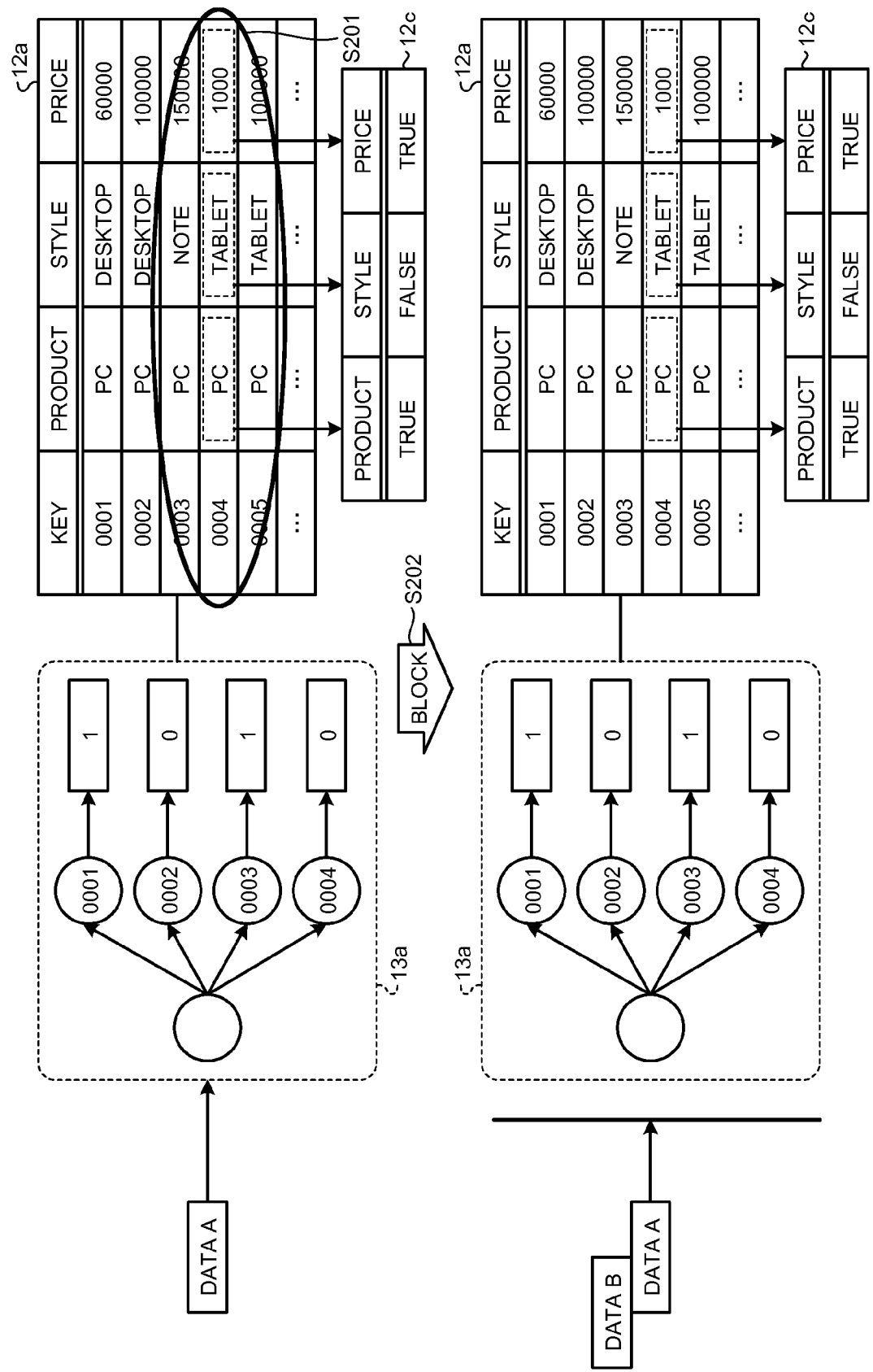
FIG. 13 is a diagram of an exemplary stream data process 1 at the update of the true-false determination table according to a third embodiment.
Figure 14:
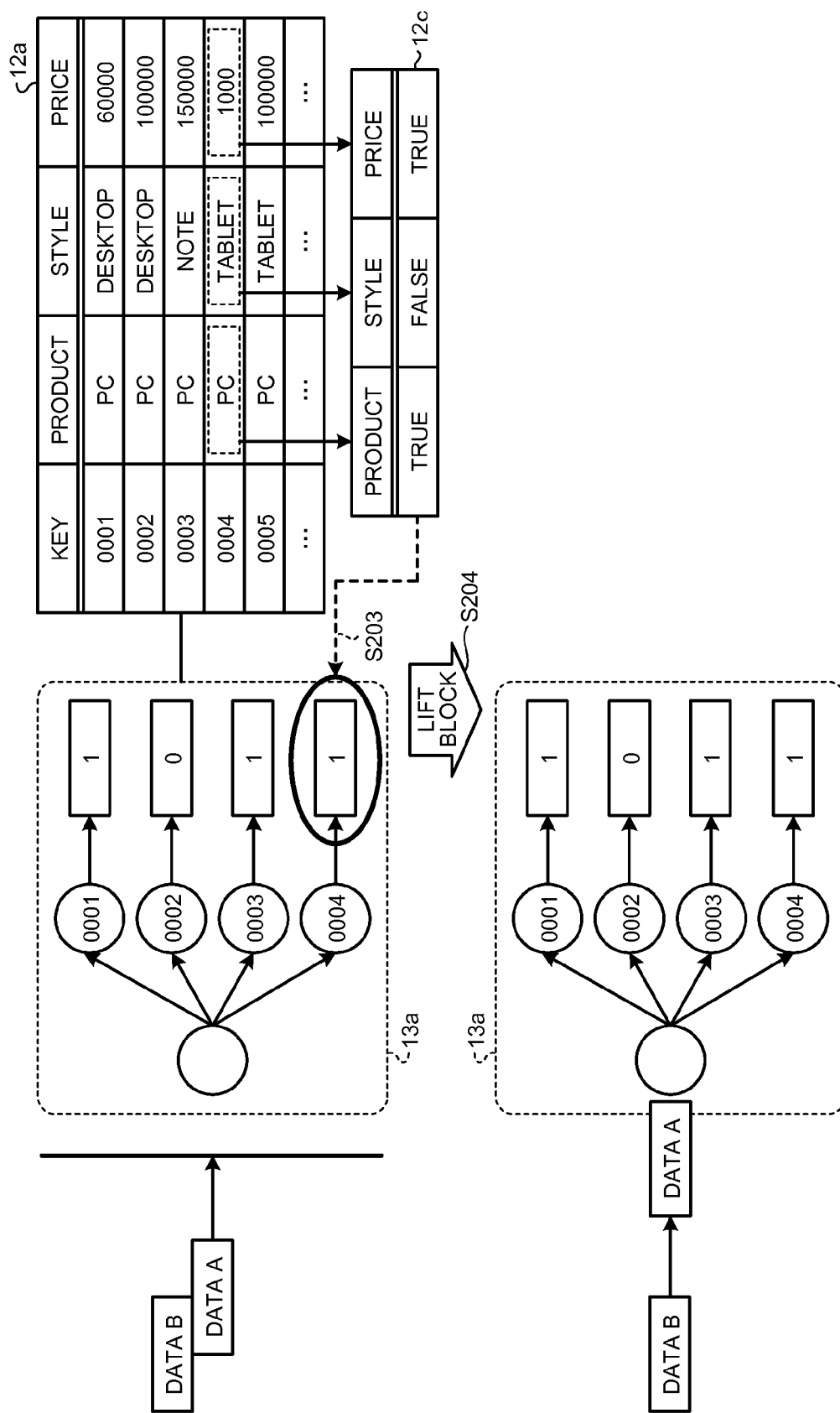
FIG. 14 is a diagram of an exemplary stream data process 1 at the update of the true-false determination table according to the third embodiment.

FIGS. 13 and 14 are diagrams of an example 1 of a stream data process at the update of the true-false determination table according to a third embodiment. As illustrated in FIG. 13, the data extraction device 10 updates the master data of which key is "0004" stored in the master information DB 12a while extracting data using the true-false determination table 13a after receiving the stream data (step S201).

Then, the data extraction device 10 blocks the reception of the stream data (step S202). In that case, the blocking means, for example, that preventing the reception causes the stream data transmission device 1 to retransmit the stream data, or that the data extraction process is prevented after the reception of the stream data. In other words, in the case in FIG. 13, the data extraction device 10 prevents the reception of the stream data A or the data extraction from the stream data A. During this time, the stream data A and stream data B that each is to be extracted and has not been processed remain.

Subsequently, as illustrated in FIG. 14, the data extraction device 10 updates the determination result of the true-false determination table 13a corresponding to the master data of which key is "0004" from "False" to "True" (step S203). After that, the data extraction device 10 lifts the block of the reception of the stream data (step S204).

As described above, the data extraction device 10 can prevent the data extraction that uses the stream data while updating the true-false determination table 13a. Thus, the data extraction device 10 can perform a data extraction determination process using the latest true-false determination table 13a and thus can avoid the errors of determination or the like.

Processing Method 2

Figure 15:
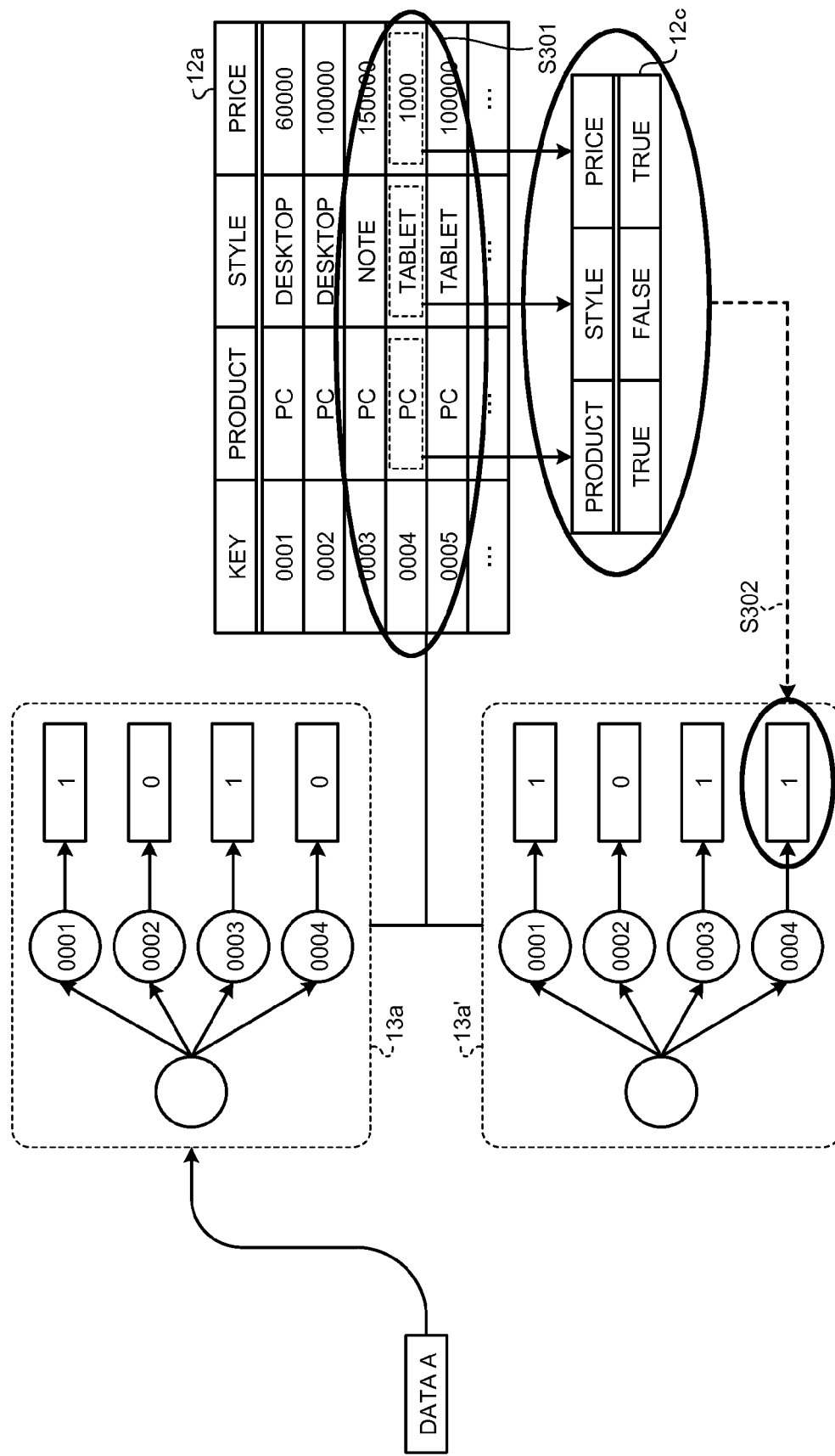
FIG. 15 is a diagram of an exemplary stream data process 2 at the update of the true-false determination table according to the third embodiment.
Figure 16:
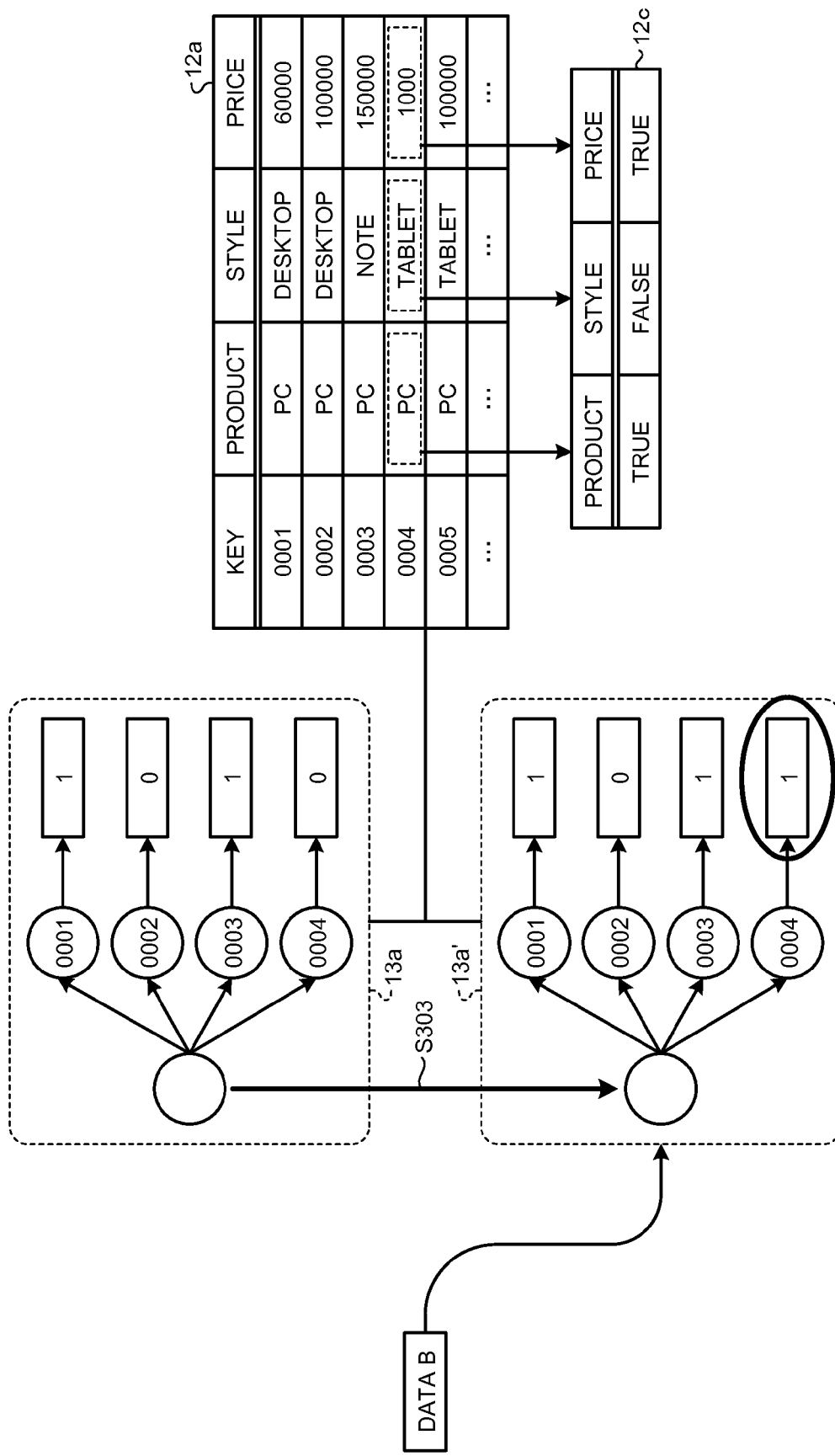
FIG. 16 is a diagram of an exemplary stream data process 2 at the update of the true-false determination table according to the third embodiment.

FIGS. 15 and 16 are diagrams of an exemplary stream data process 2 at the update of the true-false determination table according to the third embodiment. As illustrated in FIG. 15, the data extraction device 10 stores a true-false determination table 13a' including the same type of data as the true-false determination table 13a while storing the true-false determination table 13a. Generally, the data extraction device 10 performs a data extraction determination process using the true-false determination table 13a.

The data extraction device 10 updates the master data of which key is "0004" stored in the master information DB 12a (step S301) in such a state. Subsequently, the data extraction device 10 updates the determination result of the true-false determination table 13a' corresponding to the master data of which key is "0004" from "False" to "True" (step S302).

After that, illustrated in FIG. 16, the data extraction device 10 performs a data extraction determination process of the next received stream data using the true-false determination table 13a' (step S303) after completing the update of the true-false determination table 13a'. For example, the data extraction device 10 shifts the pointer for referring to the true-false determination table to switch the entrance of the stream data.

After that, the data extraction device 10 similarly updates the true-false determination table 13a. As described above, the data extraction device 10 can process the stream data without locking the reception even while updating the true-false determination table. As a result, this can speed up the data extraction.

[d] Fourth Embodiment

The embodiments of the present invention have been described above. However, the present invention can be implemented with various embodiments other than the embodiments. Accordingly, different embodiments will be described hereinafter.

A Plurality of Extraction Condition Expressions

Figure 17:
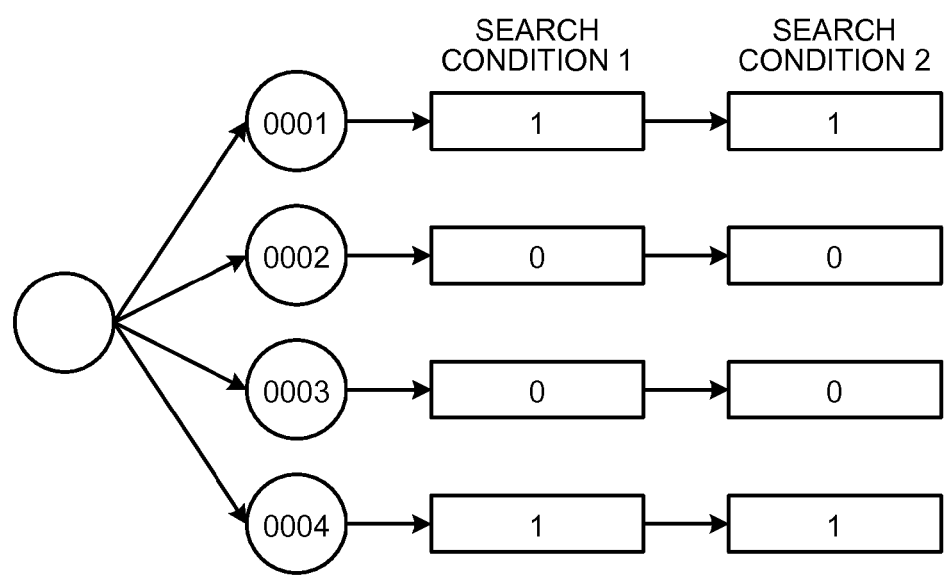
FIG. 17 is a diagram of another exemplary true-false table.

For example, when a plurality of extraction condition expression is stored in the extraction condition expression DB 12b, the data extraction device 10 can generate a true-false determination table for each condition expression. FIG. 17 is a diagram of another exemplary true-false determination table.

As illustrated in FIG. 17, the data extraction device 10 generates and maintains, for each key, a true-false determination table to which the determination result of each condition expression is linked. Then, the data extraction device 10 dynamically changes the determination result to be referred to according to the type of stream data, the identifier included in the stream data, the instruction in advance by the administrator, or the like.

As a result, the data extraction device 10 does not create a true-false determination table for each condition expression. This causes the reduction in memory capacity. A plurality of data extractions can be performed in a piece of stream data. This can speed up the process.

Intermediate Information

The example in which the data extraction device 10 generates intermediate information has been described, for example, in the first embodiment. However, the present invention is not limited to the example, and thus can generate a true-false determination table from the master information without generating intermediate information.

True-False Determination Table

The example in which the data extraction device 10 links any of "1 (True)", "0 (False)", and "−1 (NULL)" as the determination result to the true-false determination table has been described, for example, in the first embodiment. However, the present invention is not limited to the example. For example, the data extraction device 10 can register only the data in which the determination result is "1 (True)" to the true-false determination table. In such a manner, the data extraction device 10 can speed up the data extraction and can reduce the waste of memory capacity.

System

All or some of the processes described as automatically performed in the embodiments can also be manually performed. Alternatively, all or some of the processes described as manually performed in the embodiments can also be automatically performed by the publicly known method. In addition, the process, control, specific name, and information including each type of data or parameter that have been described herein and in the drawings can arbitrarily be changed except for especially described.

The components of each device illustrated in the drawings are functionally conceptual components and are not always physically configured as illustrated. In other words, the specific aspects of distribution and integration of each device are not limited to those illustrated in the drawings. The whole or a part thereof may be distributed or integrated functionally or physically in arbitrary units depending on various types of loads and usage, for example. The whole or an arbitrary part of processing functions performed in each device may be carried out by a CPU or a computer program analyzed and executed by the CPU or as wired-logic hardware.

Hardware

Figure 18:
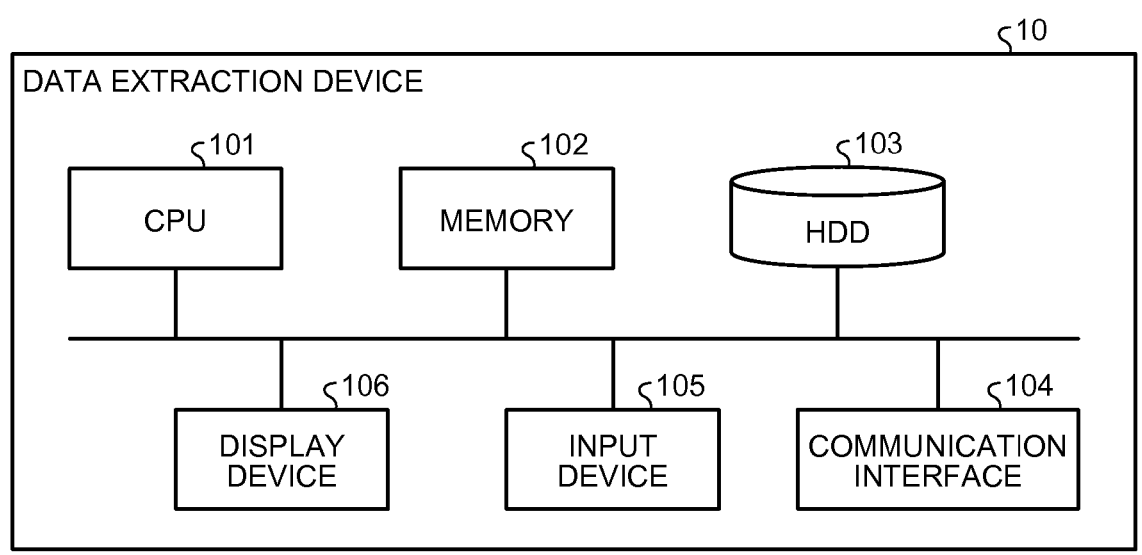
FIG. 18 is a diagram of an exemplary hardware configuration.

FIG. 18 is a diagram of an exemplary hardware configuration. As illustrated in FIG. 18, the data extraction device 10 includes a central processing unit (CPU) 101, a memory 102, a hard disk drive (HDD) 103, a communication interface 104, an input device 105, and a display device 106. The components illustrated in FIG. 18 are connected to each other, for example, through a bus.

The HDD 103 stores a program or table for operating the functions illustrated in FIG. 2. The communication interface 104 is, for example, a network interface card or a wireless interface. The input device 105 is, for example, a keyboard. The display device 106 is, for example, a touch panel or a display and is configured to display various kinds of information.

The CPU 101 operates the process performing each function described, for example, in FIG. 2 by reading a program from the HDD 103 and the like performing the same process as the processing units illustrated in FIG. 2 and developing the program to the memory 102. In other words, the process performs the same function as the function of each processing unit included in the data extraction device 10. Specifically, the CPU 101 reads, from the HDD 103, the programs having the same functions, for example, as the condition determination unit 16, the intermediate information generation unit 17, the true-false determination table generation unit 18, and the stream data process unit 19. Then, the CPU 101 performs the same process as performed with the intermediate information generation unit 17, the true-false determination table generation unit 18, and the stream data process unit 19.

As described above, the data extraction device 10 operates as an information processing device configured to perform a data extraction method by reading and executing the program. The data extraction device 10 can implement the same functions as the functions in the embodiments by reading the programs from a recording medium using a medium reading device and executing the read programs. Note that the executions of the programs described in the other embodiments are not limited to the executions with the data extraction device 10. The present invention can similarly be applied, for example, when another computer or server executes the programs or when the computer cooperates with the server to execute the programs.

According to the embodiments can speed up data extraction.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a data extraction program that causes a computer to execute a process comprising:
before receiving stream data, generating from master data in which key information is linked to data information, based on an extraction condition, a true-false determination table in which the key information is linked to a determination result; and
when the stream data is received, extracting key information that is included in the received stream data and extracting data using the true-false determination table by using the key information extracted from the received stream data.

2. The non-transitory computer-readable recording medium according to claim 1,
wherein the generating includes, when the data information in the master data is updated, updating the true-false determination table linked to the key information in the updated master data with the true-false determination table with respect to the updated data information and, when the master data is deleted, updating the true-false determination table linked to the key information in the deleted master data with deletion information indicating that the master data is deleted.

3. A non-transitory computer-readable recording medium having stored therein a data extraction program that causes a computer to execute a process comprising:
generating, based on master information and an extraction condition, a determination result indicating whether the master information is an extraction target, the determination result corresponding to key information included in the master information which is determined as satisfying the extraction condition among a plurality of pieces of the master information each including key information and data information;
when stream data is received, determining, using the determination result, whether master information that is specified based on the received stream data is to be extracted;
generating intermediate data that has determined whether each piece of configuration data included in the data information satisfies a condition associated with the configuration data among a plurality of conditions included in the extraction condition;
determining, when the extraction condition is updated, whether each piece of the configuration data associated with the updated extraction condition satisfies the condition, and updating the intermediate data using the determination result; and
updating the determination result of the second data based on the updated intermediate data and the updated extraction condition.

4. A data extraction method comprising:
before receiving stream data, generating from master data in which key information is linked to data information, based on an extraction condition, a true-false determination table in which the key information is linked to a determination result; and
when the stream data is received, extracting key information that is included in the received stream data and extracting data using the true-false determination table by using the key information extracted from the received stream data.

5. A data extraction device comprising:
a memory; and
a processor connected to the memory wherein the processor executes a process comprising:
before receiving stream data, generating from master data in which key information is linked to data information, based on an extraction condition, a true-false determination table in which the key information is linked to a determination result; and
when the stream data is received, extracting key information that is included in the received stream data and extracting data using the true-false determination table by using the key information extracted from the received stream data.

* * * * *